United States Patent [19]

Inoue et al.

[11] Patent Number: 5,048,927

[45] Date of Patent: Sep. 17, 1991

[54] INDICATION DISPLAY UNIT FOR VEHICLES

[75] Inventors: Tai Inoue; Tsuyoshi Ohshima; Tatsumi Ohtsuka; Hiroshi Ichikawa, all of Susono, Japan

[73] Assignee: Yazaki Corporation, Tokyo, Japan

[21] Appl. No.: 302,853

[22] Filed: Jan. 27, 1989

[51] Int. Cl.⁵ .................. G02B 27/14; G09G 3/02; G01C 21/00
[52] U.S. Cl. .................................. 359/618; 340/705; 340/980
[58] Field of Search ............... 350/97, 104, 106, 109, 350/123–127, 321, 322, 629, 630, 601–610, 172, 174, 320; 340/700–704, 784, 461, 705, 980; 353/13, 14, 67, 98

[56] References Cited

U.S. PATENT DOCUMENTS

| | | | |
|---|---|---|---|
| 3,930,723 | 1/1976 | Holt | 350/123 |
| 4,013,353 | 3/1977 | Portnor et al. | 350/629 |
| 4,299,446 | 11/1981 | Jenkins, Jr. | 350/630 |
| 4,403,216 | 9/1983 | Yokoi | 340/702 |
| 4,429,953 | 2/1984 | Zehnpfennig et al. | 350/630 |
| 4,623,223 | 11/1986 | Kempf | 350/630 |
| 4,711,544 | 12/1987 | Iino et al. | 353/98 |
| 4,831,366 | 5/1989 | Iino | 350/174 |
| 4,886,328 | 12/1989 | Iino | 350/174 |
| 4,908,611 | 3/1990 | Iino | 350/174 |
| 4,967,191 | 10/1990 | Iino | 350/174 |

FOREIGN PATENT DOCUMENTS 152544 10/1985 Japan.
2204421 11/1988 United Kingdom ............... 340/705

Primary Examiner—Bruce Y. Arnold
Assistant Examiner—Thong Nguyen
Attorney, Agent, or Firm—Armstrong, Nikaido, Marmelstein, Kubovcik & Murray

[57] ABSTRACT

An indication display unit for a vehicle, includes a reflecting device having a reflecting surface directed to a driver's seat which reflecting surface has a reduced reflectivity. An indicating device having an indicating surface directed to the reflecting surface of the reflecting device. Operational information concerning driving operation of the vehicle is indicated on the indicating surface of the indicating device, and is reflected on the reflecting surface of the reflecting device to be visibly observed by a driver. As the reflectivity of the reflecting surface is reduced, the visibility of the displayed image from the indicating surface may be improved. Since the reflecting device is provided on a dashboard, and the indicating device is located at any position other than the dashboard, a meter hood may be removed to ensure more space in the dashboard. The reflecting device is composed of a reflecting plate and a frame for supporting the reflecting plate, which is preliminary curved with a relatively good accuracy. In constructing the reflector, the reflecting plate is cured by forcibly following the curvature of the frame, thereby easily obtaining a curvature of the reflecting plate with a relatively good accuracy.

8 Claims, 14 Drawing Sheets

INDICATION DISPLAY UNIT FOR VEHICLES

BACKGROUND OF THE INVENTION

1. Field of the Invention

The present invention relates to an indication display unit for vehicles including indicators for indicating various information concerning driving operation such as vehicle speed, revolutional frequency of engine, residual fuel quantity, time and other various warnings, and also including a reflecting member having a reflecting surface on which indicated images by an indicating means normally composed of various indicators are reflected to allow the reflected images to be visibly observed by a driver.

2. Description of the Prior Art

Conventionally, it has been proposed that the reflecting surface of the reflecting member is made concave as shown in FIG. 12, so as to obtain a sufficient large reflected image magnified from a small displayed image from the indicators. In such a conventional device, the reflecting member is formed from a glass plate preliminarily curved, and a reflecting film is deposited on a front surface of the glass plate, if required.

Referring to FIG. 12, reference character C designates a center of arc forming a reflecting surface 1 having a radius of curvature R, and reference characters F and 0 designate a focus and an origin of the reflecting surface 1, respectively. A displayed image PQ from the indicator is formed at a distance a from the origin 0, and an erect virtual image P'Q' of the displayed image PQ is formed at a distance b from the origin 0. In this case, if the distance a satisfies the condition of $R/2 < a < R$, a desired magnification $b/a$ ($=m$) of the erect virtual image may be obtained by suitably deciding the values of a and R from the following formula in the concave reflecting mirror.

$$1/a + 1/b = 1/f \ (=R/2)$$

However, it is hard to obtain a desired curvature of the concave reflecting mirror of the glass plate 1, causing distortion of the reflected image.

Recently, in order to ensure a sufficient space in a dash board, there has been proposed that a semi-transparent reflecting mirror is located at a position of an instrument panel, and indicating means for indicating the revolutional frequency of the engine, vehicle speed, residual fuel quantity, etc. to be essentially indicated is mounted on a lower surface of a meter hood, while various warning lamps which are not so essential are located behind the reflecting mirror. With this arrangement, the displayed image from the indicator is reflected on the reflecting mirror, and the images from the warning lamps are transmissively observed through the reflecting mirror (Japanese Utility Model Laid-open Publication No. 60-152544).

In this conventional device, both the transmissive image from the warning lamps and the displayed image from the indicating means are visually observed by the driver. Simultaneously, a sufficient space may be ensured in the dash board by not locating the indicating means behind the instrument panel, namely, in the dash board.

However, as the meter hood is yet present, and the reflecting mirror is located at a position deeply inside the dash board, a sufficient space to be defined in the dash board is limited. Further, the meter hood is intended not only for the location of the meter indicator but also for prevention of reflection of the image from the warning lamps located behind the reflecting mirror on a windshield. Accordingly, even if the meter indicator is located at any position other than the meter hood, the meter hood is still necessary to prevent the reflection of the image from the warning lamps on the windshield.

SUMMARY OF THE INVENTION

It is a first object of the present invention to provide an indication display unit for vehicles, having a reflecting means formed with a concave reflecting surface which may be easily curved with a desired accurate curvature.

It is a second object of the present invention to provide an indication display unit for vehicles which may eliminate meter hood and ensure a more space in the dash board.

It is a third object of the present invention to provide an indication display unit for vehicles which may suppress the reflection of images other than the projected images from the indicating means, thereby improving the visibility of the projected images.

According to a first aspect of the present invention, there is provided an indication display unit for a vehicle, comprising a reflecting device having a reflecting surface directed to a driver's seat which reflecting surface has a reduced reflectivity, and an indicating device having an indicating surface directed to the reflecting surface of the reflecting device, wherein operational information of the vehicle is indicated on the indicating surface of the vehicle, and is reflected on the reflecting surface of the reflecting device, and wherein the reflecting device comprises a partially transmissive reflecting plate and a preliminarily curved frame for supporting an outer periphery of the reflecting plate, which is curved by forcibly following a curvature of the frame.

As mentioned above, considering the first aspect of the present invention, the reflecting plate is curved by forcibly following the curvature of the frame which is preliminarily curved. That is, it is unnecessary to preliminarily curve the reflecting plate. As the frame can be preliminarily curved relatively accurately, the curvature of the reflecting plate can be made accurate by simply following the curvature of the frame.

According to a second aspect of the present invention, there is provided an indication display unit for a vehicle, comprising a reflecting device having a reflecting surface directed to a driver's seat which reflecting surface has a reduced reflectivity, and an indicating device having an indicating surface directed to the reflecting surface of the reflecting device, wherein operational information of the vehicle is indicated on the indicating surface of the vehicle, and is reflected on the reflecting surface of the reflecting device, and wherein the reflecting device is provided on a dash board at a position of an instrument panel, and the indicating device is provided any position other than the dash board.

As mentioned above, considering the second aspect of the present invention, the reflecting device only is located on the dash board at the position of the instrument panel, and the indicators composing the indicating device are located at any position other than the dash board to project the displayed images on the indicating surfaces to the reflecting surface of the reflecting device in such a manner that an erect virtual image of the displayed images formed on the back side of the reflecting device may be visibly observed by the driver. Accordingly, even when a portion of the dash board at the position of the instrument panel is reflected on the windshield, the reflected images are not observed by the driver, and it is therefore unnecessary to provide a meter hood.

According to a third aspect of the present invention, there is provided an indication display unit for a vehicle, comprising a reflecting device having a reflecting surface directed to a driver's seat which reflecting surface has a reduced reflectivity, and an indicating device having an indicating surface directed to the reflecting surface of the reflecting device, wherein operational information of the vehicle is indicated on the indicating surface of the vehicle, and is reflected on the reflecting surface of the reflecting device.

As mentioned above, considering the third aspect of the present invention, the reflectivity of the reflecting surface of the reflecting device is reduced. Accordingly, an incident light of the displayed image from the indicating surface onto the reflecting surface is attenuated by the reflecting surface having the reduced reflectivity, and a reflected image thus attenuated to reach the driver's eyes. Since the intensity of light of image other than the displayed image from the indicating surface is lower than that of the light of the displayed image, the image other than the displayed image is hardly visibly observed by the driver.

Other objects and features of the invention will be more fully understood from the following detailed description and appended claims when taken with the accompanying drawings.

DETAILED DESCRIPTION OF THE PREFERRED EMBODIMENTS

Figure 1:
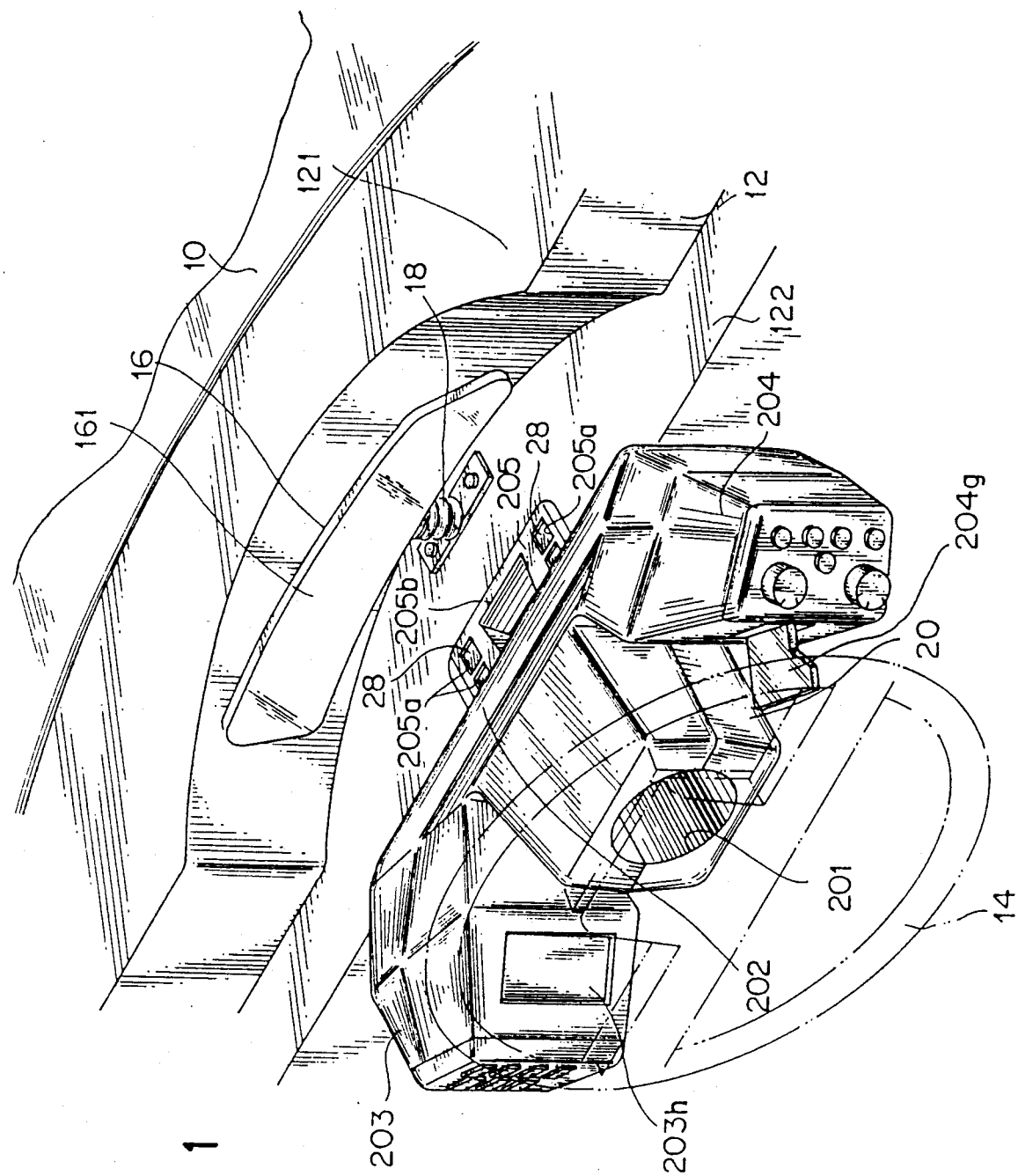
FIG. 1 is a perspective view of a first preferred embodiment of the indication display unit for vehicles according to the present invention.
Figure 2:
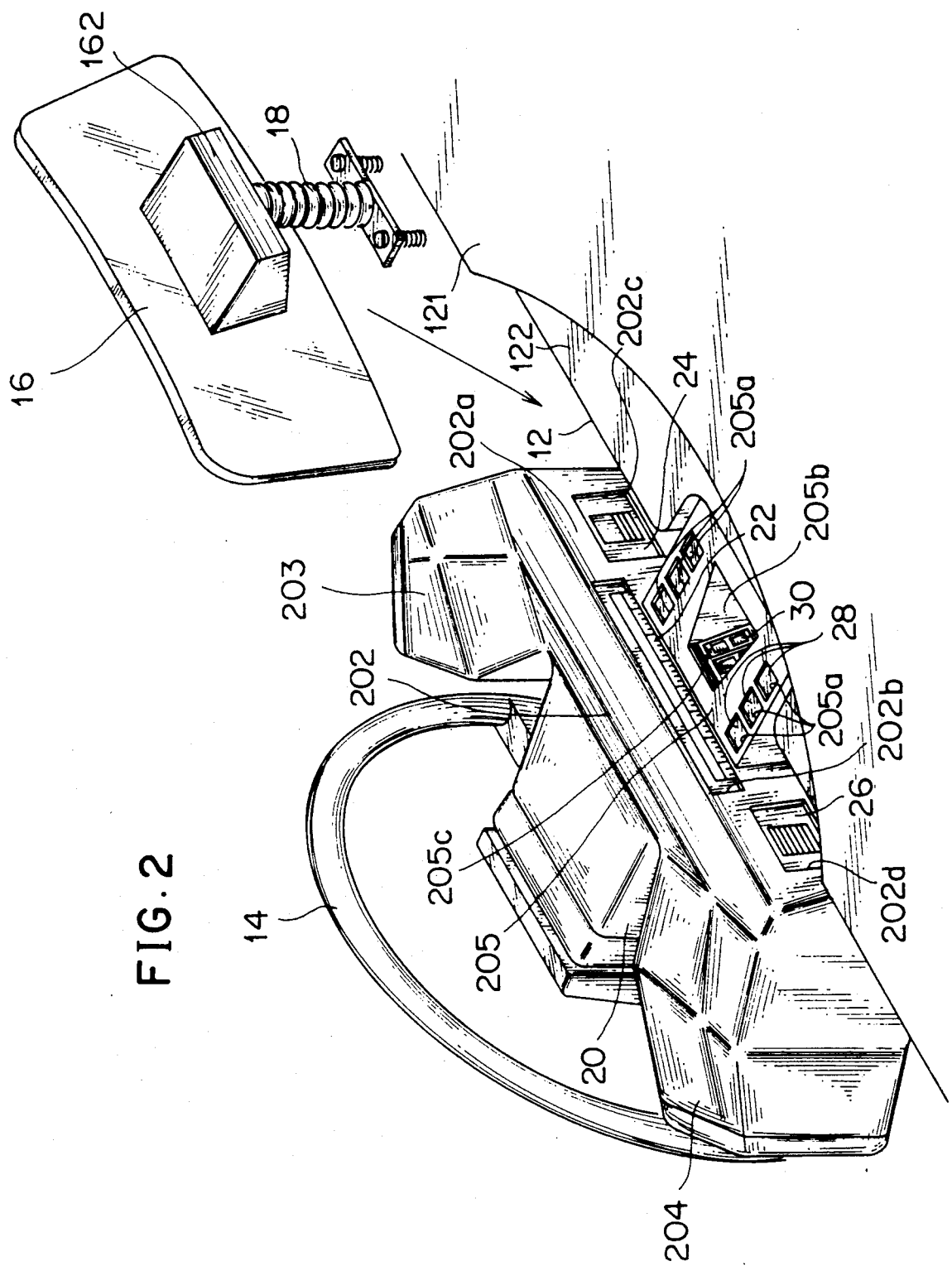
FIG. 2 is a partially exploded perspective view of the first preferred embodiment as viewed in a direction different from that in FIG. 1.
Figure 3:
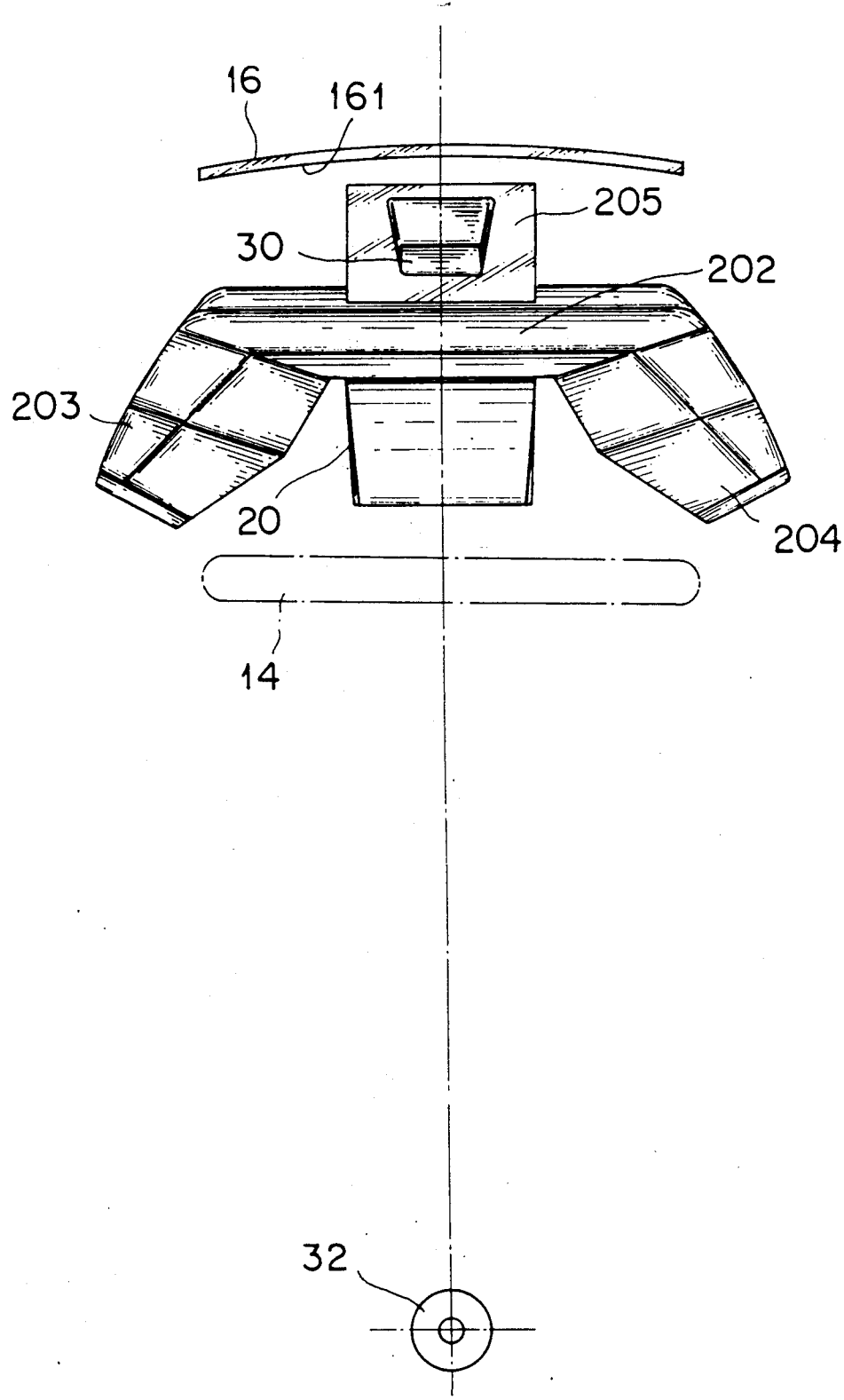
FIG. 3 is a top plan view of the indication display unit shown in FIG. 1.

Referring to FIGS. 1 to 11 which show a first preferred embodiment of the present invention, reference numerals 10, 12 and 14 designate a windshield of a vehicle, a dash board and a steering wheel, respectively.

The dash board 12 projects from a lower edge of the windshield 10 inwardly of a compartment to form a substantially horizontal upper surface 121. The upper surface 121 is arcuately cut out at a position opposite to a driver's seat to form a recessed portion 122. A reflecting member 16 for reflecting an indicating image from an indicator which will be hereinafter described is mounted on the recessed portion 122 through a supporting member 18 in such a manner that a reflecting surface 161 of the reflecting member 16 is directed to the driver's seat at a position corresponding to an instrument panel of the dash board 12.

The reflecting member 16 has a substantially rectangular shape in such a manner that longer sides extend horizontally. The reflecting surface 161 is slightly concave along the longer sides, and it is slightly inclined downwardly. In this manner, the reflecting member 16 is supported to the supporting member 18. A connecting portion 162 is provided on a back surface of the reflecting member 16, that is, on the surface opposite to the reflecting surface 161, so as to connect the reflecting member 16 with the supporting member 18 in such a manner that an inclined angle of the reflecting surface 161 can be adjusted within a range of 2–3 degrees.

There will now be described a detailed construction of the reflecting member 16 and the supporting member 18 with reference to FIGS. 7 to 11.

The reflecting member 16 is constructed of a partially transmissive reflecting plate 16a, an iron plate 16b preliminarily curved by molding, an open frame 16c preliminarily curved by molding in the same manner as the iron plate 16b, a packing 16d and a back plate 16e. The reflecting plate 16a is so-called a semi-transparent mirror constructed of a thin flat glass plate $16a_1$ and a metal deposition film $16a_2$ formed by depositing metal such as $TiO_2$ on a front surface of the glass plate $16a_1$.

The iron plate 16b and the open frame 16c can be formed relatively accurately by using a molding. The reflecting plate 16a and the packing 16d are interposed between the iron plate 16b and the open frame 16c, and these members are integrated as an unit by tightening screws 16f at the peripheral portions of the iron plate 16b and the open frame 16c. As a result, the outer peripheral portion of the reflecting plate 16a follows the open frame 16c to be forcibly curved in accordance with the curvature of the iron plate 16b, so that the reflecting surface exposed from an opening $16c_1$ of the open frame 16c is made concave. The back plate 16e serving as a trim board is fixed to the back surface of the iron plate 16b by fitting or bonding.

The supporting member 18 mounted on the back surface of the reflecting member 16 has a pair of bolts 18a to be inserted into a pair of holes 12a formed through the dash board 12. The supporting member 18 includes a stay 18c to be fixed to the dash board 12 by threadedly engaging a pair of nuts 18b with the bolts 18a, a support post 18d uprightly fixed at its one end to the stay 18c, and a channel-like U-shaped bracket 18e fixed to the other end of the support post 18d. The U-shaped bracket 18e is connected with a pair of projections 16g provided on the back surface of the reflecting member 16 by means of caulkings 18f, for example, in such a manner that the reflecting member 16 can be rotated within a predetermined angular range of about 2-3 degrees. A bellows tube 18g for trimming is covered around the support post 18d, and a cover member 18h is provided to cover the connecting portion between the reflecting member 16 and the supporting member 18. Further, a friction member such as felt may be interposed between the projections 16g and the bracket 18e, so as to ensure a rotational position of the reflecting member 16.

Reference numeral 20 designates a steering column surrounding a steering shaft (not shown) for connecting the steering wheel 14 with a steering mechanism mounted in an engine room. The steering column 20 is formed at its central portion with an insertion hole 201 for inserting the steering shaft thereinto. The steering column 20 is slightly inclined downwardly to the front of the vehicle along the steering shaft, and a front end portion of the steering column 20 on the opposite side of the steering wheel 14 is inserted into the dash board 12.

The rear portion of the steering column 20 on the steering wheel 14 side has an upper surface of substantially the same level as the upper surface of the recessed portion 122, and the upper surface of the rear portion of the steering column 20 projects upwardly from a rear end to a longitudinal central portion. Furthermore, the longitudinal central portion of the steering column 20 extends sidewardly or horizontally in respectively opposite directions to form an indicator receiving portion 202. Furthermore, the indicator receiving portion 202 projects rearwardly at its lateral ends toward the steering wheel 14 to form switch receiving portions 203 and 204.

The indicator receiving portion 202 has a surface 202a opposed to the reflecting surface 161 of the reflecting member 16, and the surface 202a is formed with openings 202b, 202c and 202d through which indicating surfaces 22, 24 and 26 of different indicators fixedly received in the indicator receiving portion 202 are exposed, respectively. More specifically, the indicating surface 22 exposed through the opening 202b is provided for an engine speed indicator designed to indicate the revolutional frequency of the engine in a bar graph fashion. The indicating surface 24 exposed through the opening 202c is provided for a water temperature indicator, opening 202d is provided for a residual fuel quantity indicator.

Further, another indicator receiving portion 205 is so formed as to project into the dash board 12. The indicator receiving portion 205 is formed on its upper surface with two rows of openings 205a and a sectionally V-shaped recess 205b. Each row of openings 205a includes three openings arranged longitudinally of the upper surface of the indicator receiving portion 205, through which openings 205a are exposed a plurality of indicating surfaces 28 for various warning indicators such as a door open warning indicator, seat belt warning indicator, etc. The sectionally V-shaped recess 205 is formed on its inner surface opposed to the reflecting surface 161 of the reflecting member 16 with an opening 205c through which is exposed an indicating surface 30 of a vehicle speed indicator for indicating a vehicle speed.

These indicators received in the indicator receiving portions 202 and 205 are preferably constructed of a self-luminescent display using a fluorescent character display tube, light emitting diode or transmissive liquid crystal having a back light, for example.

The switch receiving portions 203 and 204 encase various switches, and operation buttons of these switches are arranged in the vicinity of the steering wheel 14 so that the operation buttons may be operated by any fingers of a hand put on the steering wheel 14.

More specifically, the switch receiving portion 204 encases various column switches adapted to be operated by a rear-window defogger switch button 204a, hazard warning flasher switch button 204b, parking switch button 204c, washer switch button 204d, light switch button 204e, wiper switch button 204f, turn signal switch lever 204g, etc. On the other hand, the switch receiving portion 203 encases various switches for operating an air conditioner, radio and navigation device mounted on the vehicle. Reference numerals 203a, 203b, 203c and 203d designate select switch buttons and reference numerals 203e, 203f and 203g designate mode designation switch buttons for selecting the operation of the air conditioner, radio or navigation device when the select switch buttons are operated. Furthermore, the switch receiving portion 203 encases a dot-matrix indicator for indicating a function or the like of the select switch buttons 203a-203d. Reference numeral 203h designates an indicating surface of the dot-matrix indicator which surface is directed to a driver.

Figure 4:
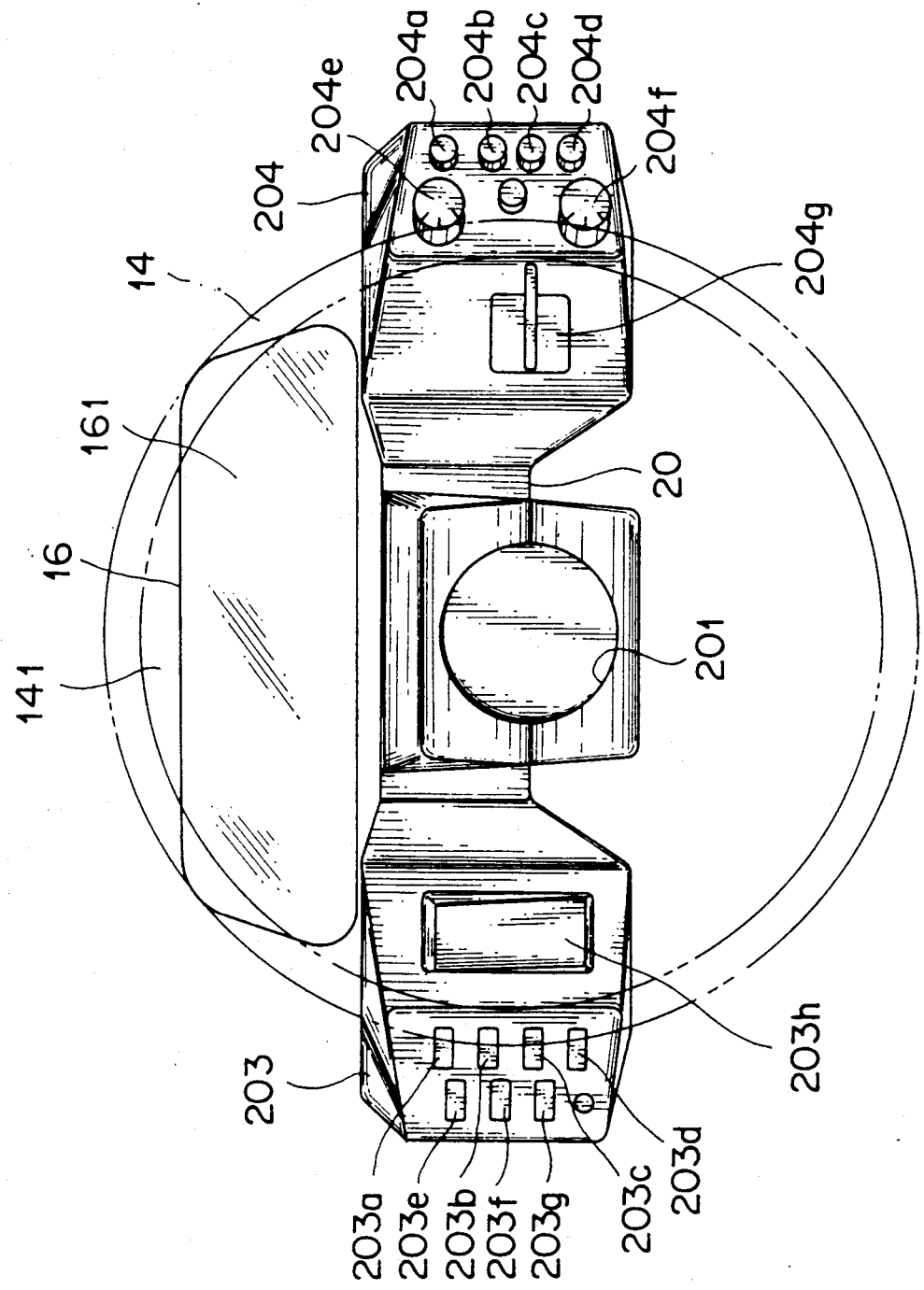
FIG. 4 is a front elevational view of the indication display unit shown in FIG. 1.
Figure 5:
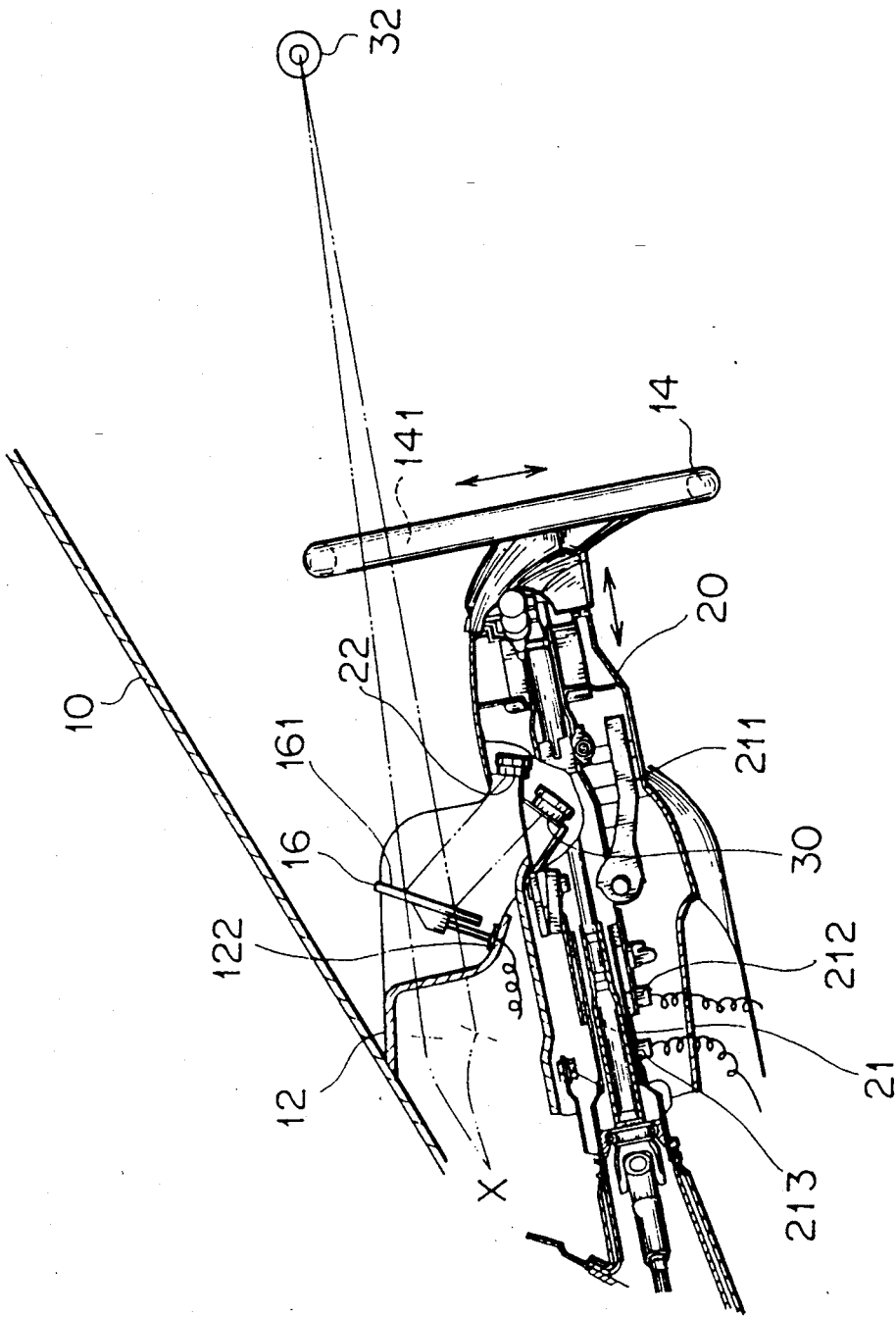
FIG. 5 is a sectional side view of the indication display unit shown in FIG. 1.

With this arrangement, the driver sitting on the driver's seat can look at the reflecting surface 161 of the reflecting member 16 through an upper semi-circular vacancy 141 of the steering wheel 14 as shown in FIGS. 4 and 5. Accordingly, as shown in FIG. 5, the displayed images on the indicating surfaces 22, 24, 26, 28 and 30 are projected to the reflecting surface 161 of the reflecting member 16, and are reflected on the reflecting surface 161. Then, the reflected images are visually observed by eyes 32 of the driver through the vacancy 141 of the steering wheel 14. As a result, the driver can sight an erect virtual image X of the displayed images as formed at a predetermined position on the back side of the reflecting member 16.

On the reflecting surface 161 of the reflecting member 16 is reflected not only the projected images from the indicating surfaces 22-30 but also peripheral images around the indicating surfaces 22-30. Accordingly, if the reflecting surface 161 were a total reflecting surface, the peripheral images would be superimposed on the projected images from the indicating surfaces 22-30, causing a reduction in visibility of the projected images. However, according to the above preferred embodiment of the present invention, since the reflecting plate 16d forming the reflecting surface 161 of the reflecting member 16 is a semi-transparent mirror composed of the glass plate $16a_1$ and the metal deposition film $16a_2$ formed on the front surface of the glass plate $16a_1$, the reflectivity of the reflecting surface 161 is reduced. As the intensity of light from the peripheral images is lower than that from the projected images from the indicating surfaces, and the light is attenuated upon incidence and reflection by the reflecting surface 161, the peripheral images are rendered almost invisible when they reach the driver's eyes. On the other hand, although the light from the projected images is also attenuated, the visibility thereof is sufficiently ensured since the intensity of light from the projected images is sufficiently high.

Figure 6:
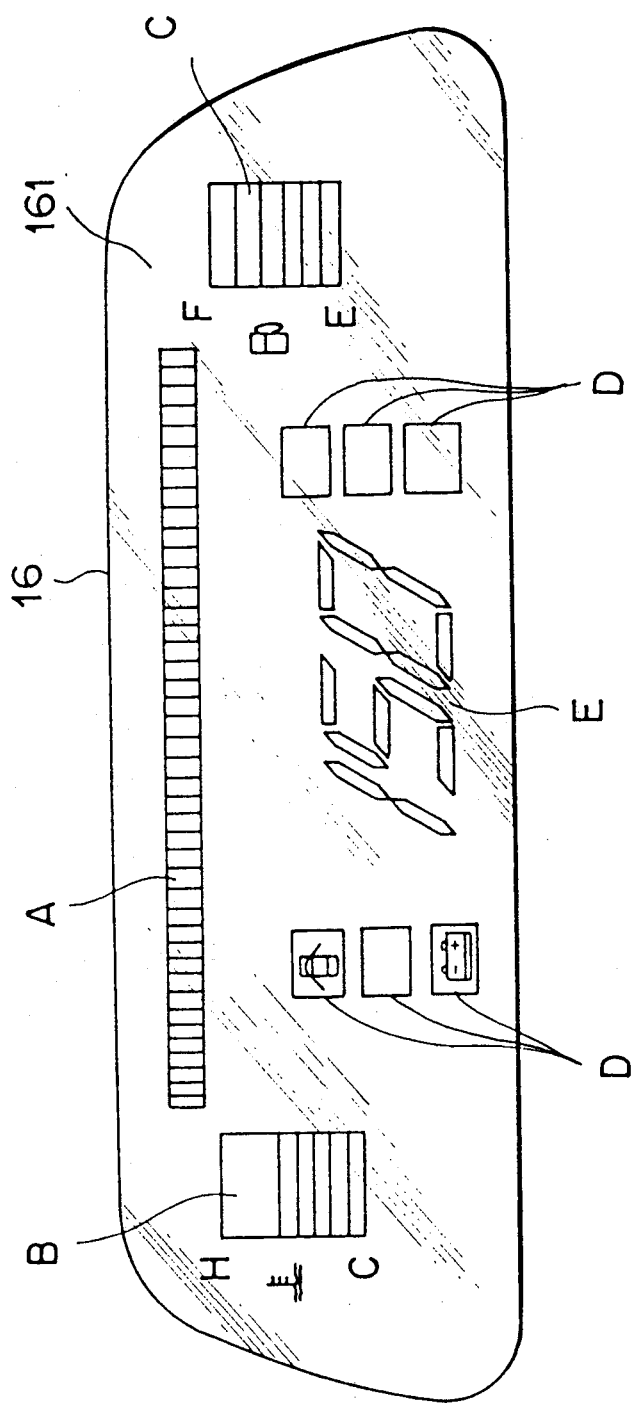
FIG. 6 is an exemplary illustration of a displayed image on the reflecting surface of the reflecting member.
Figure 7:
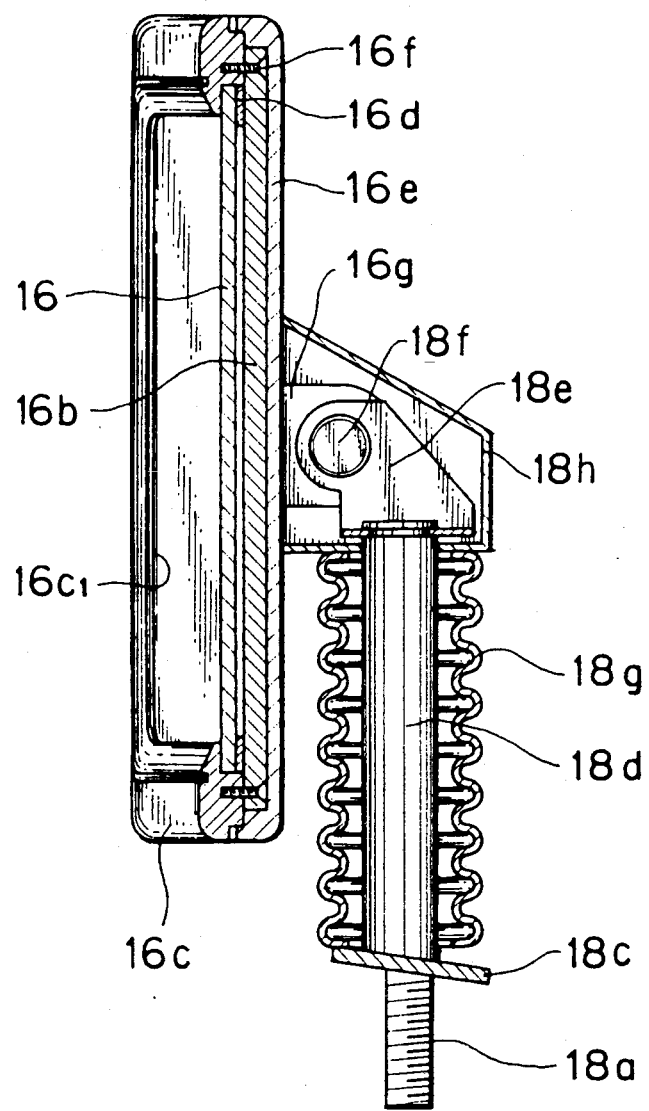
FIG. 7 is a sectional side view of the assembly of the reflecting member and the supporting member.
Figure 8:
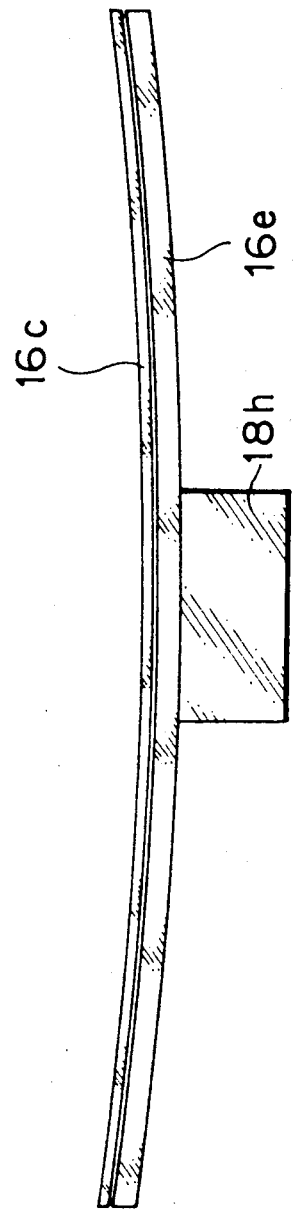
FIG. 8 is a top plan view of the assembly shown in FIG. 7.
Figure 9:
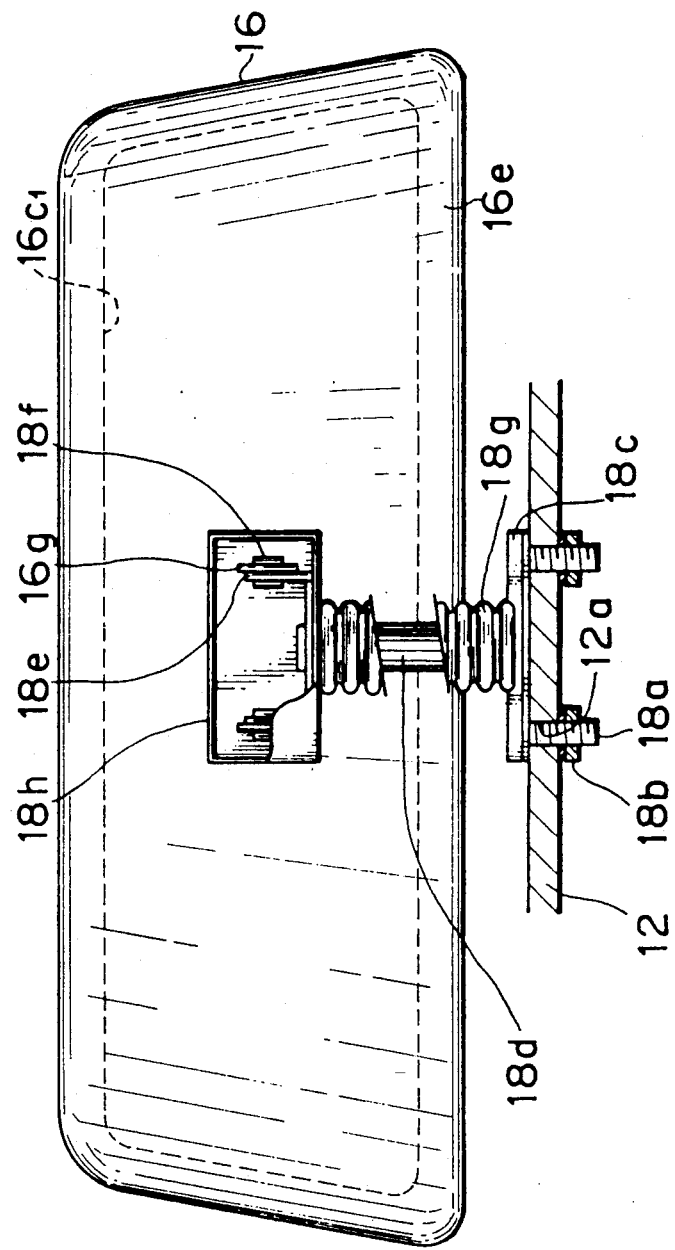
FIG. 9 is a rear elevational view of the assembly shown in FIG. 7.
Figure 10:
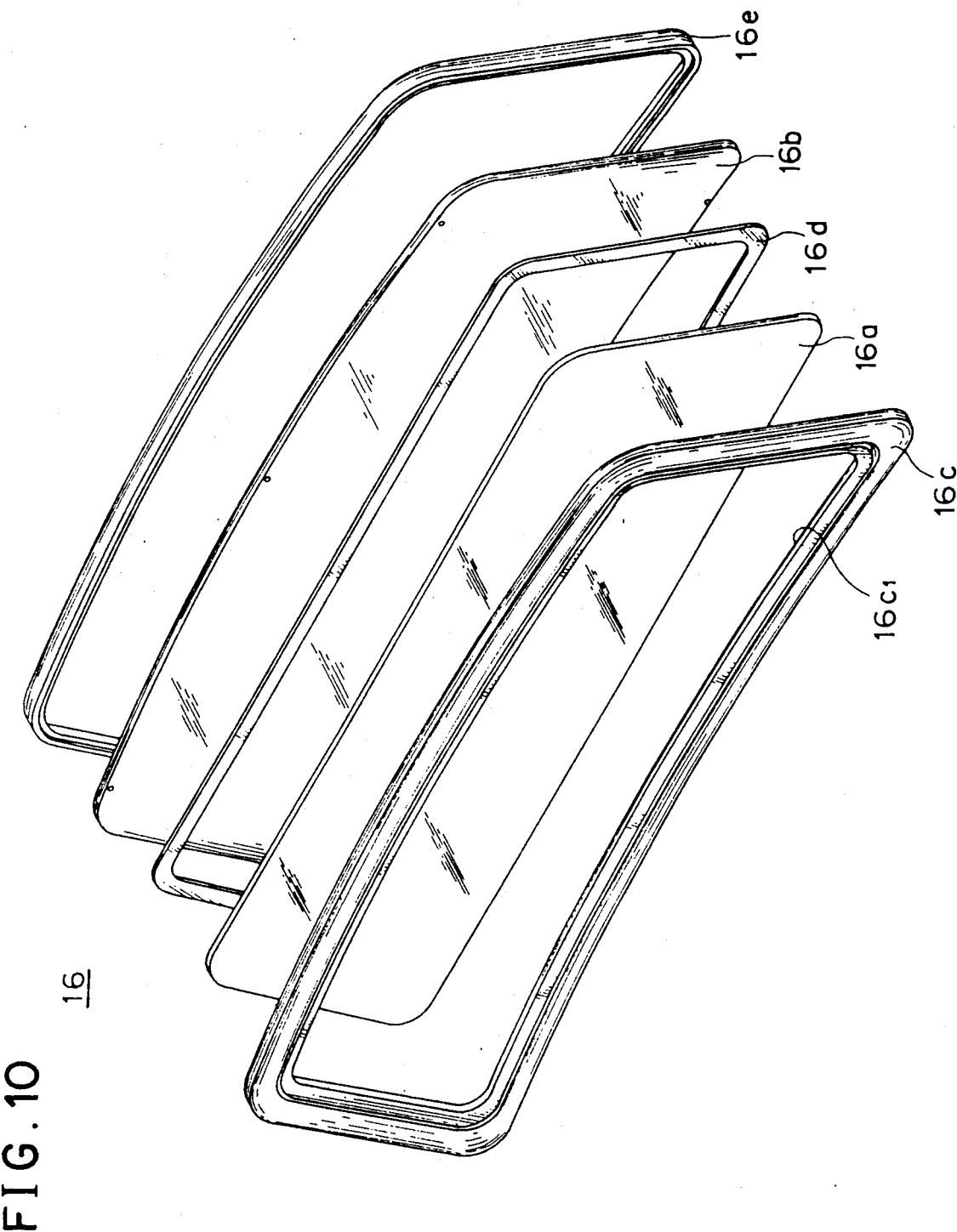
FIG. 10 is an exploded perspective view of the reflecting member.
Figure 11:
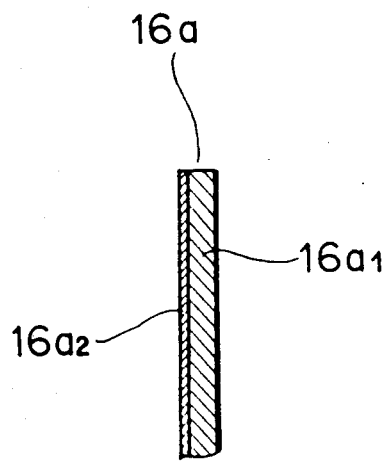
FIG. 11 is a vertical sectional view of a part of the reflecting plate shown in FIG. 10.

FIG. 6 shows an example of the displayed images projected on the reflecting surface 161 of the reflecting member 16 as visibly observed by the driver. In the illustration shown in FIG. 6, reference characters A, B and C designate bar indications of the revolutional frequency of the engine speed, water temperature and residual fuel quantity, respectively, and reference characters D and E designate indications of warning and vehicle speed, respectively.

As mentioned above, the reflecting member 16 only is located on the dash board 12 at the position of the instrument panel, and the indicators are located in the steering column 20 to project the displayed images on the indicating surfaces to the reflecting surface of the reflecting member in such a manner that the erect virtual image of the displayed images formed on the back side of the reflecting member may be visibly observed by the driver. Accordingly, even when a portion of the dash board 12 at the position of the instrument panel is reflected on the windshield 10, the reflected images are not observed by the driver, and it is therefore unnecessary to provide a meter hood.

Figure 13:
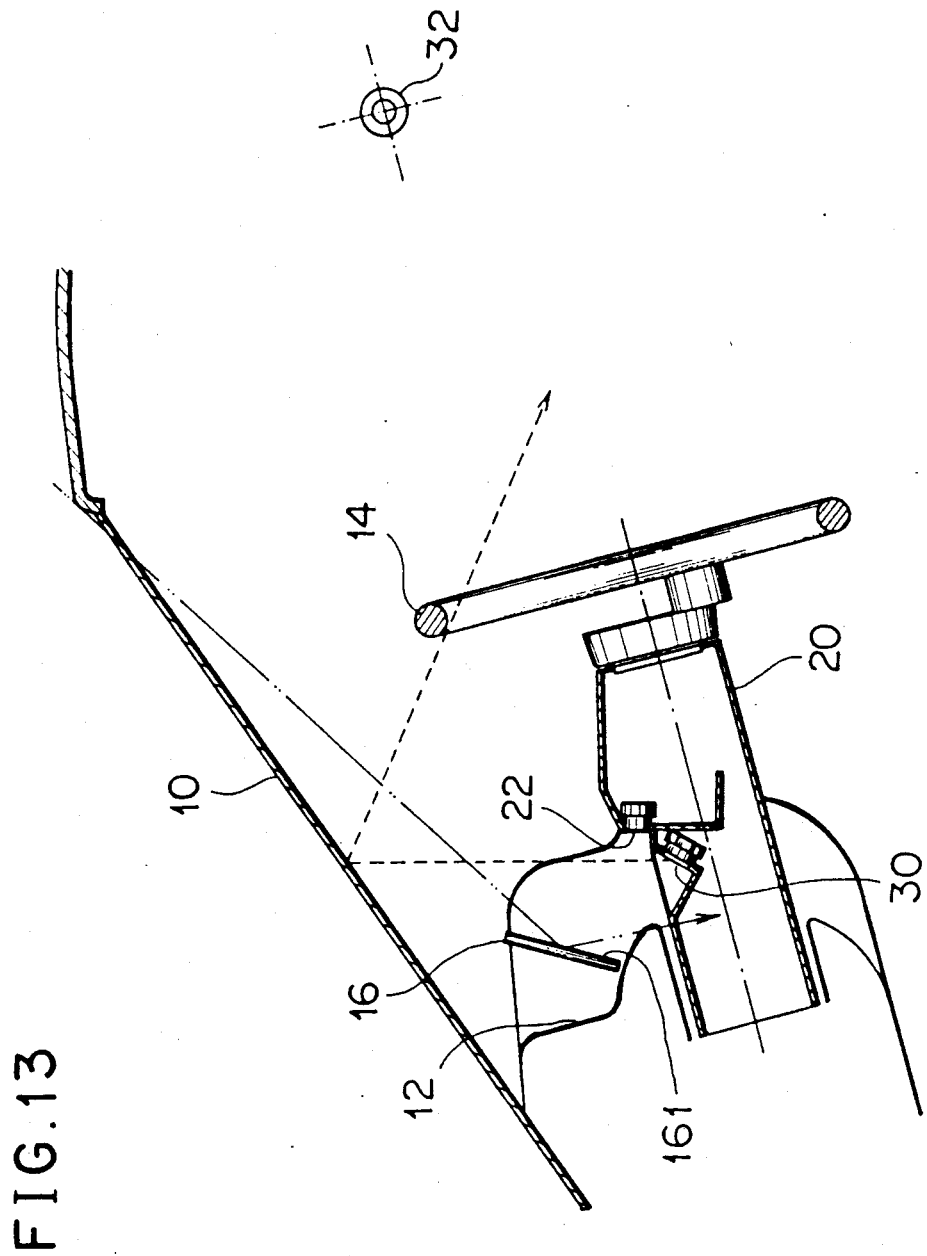
FIG. 13 is a view similar to FIG. 5, showing the effect of the preferred embodiment.

Furthermore, as shown by a chain line in FIG. 13, even when an external light enters the reflecting surface 161 of the reflecting member 16 through the windshield 10, a reflected light from the reflecting surface 161 does not reach the driver's eyes 32. Further, even when the displayed images projected from the indicating surface 30, for example, are reflected on the windshield 10, the reflected images are not observed by the driver since a direction of reflection is widely offset from the driver's eyes 32.

Figure 14:
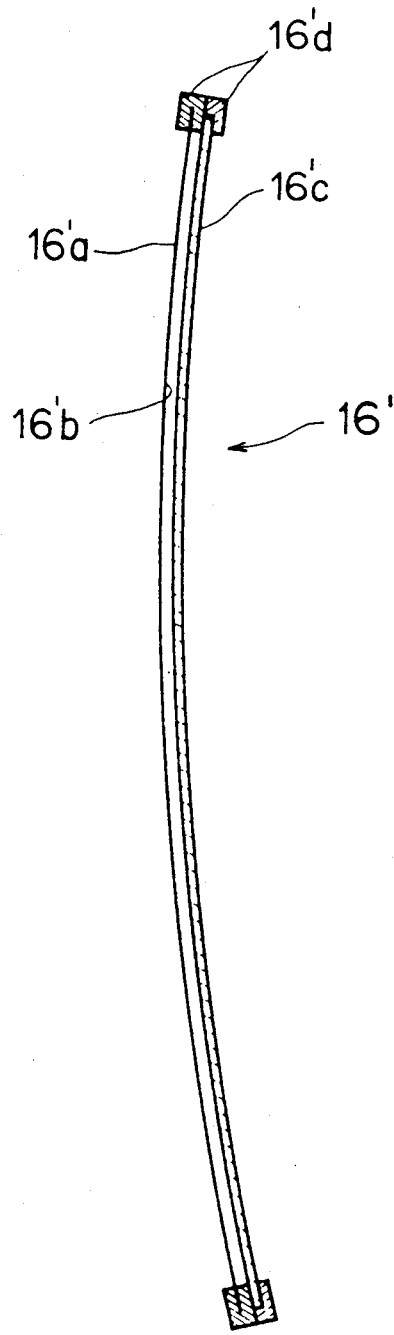
FIG. 14 is a horizontal sectional view of the reflecting member in a second preferred embodiment of the present invention.

Referring next to FIG. 14 which shows a second preferred embodiment of the present invention, reference numeral 16' designates a reflecting member to be mounted in the same manner as in the first preferred embodiment. The reflecting member 16' is composed of a total reflecting mirror 16'a and a smoked plate 16'c provided on the front surface of the total reflecting mirror 16'a in such a manner as to entirely cover a mirror surface 16'b of the mirror 16'a. The smoked plate 16'c serving to greatly attenuate the light transmitted therethrough is formed from a smoked acrylic resin plate or a smoked polyester film, for example.

Letting $I_{o(\lambda)}$ and $I_{i(\lambda)}$ denote the intensities of incident light and reflected light to/from the reflecting member 16', respectively, and letting $T_{F(\lambda)}$ and $R_{M(\lambda)}$ denote a transmissivity (%) of the smoked plate 16'c and a reflectivity (%) of the total reflecting mirror 16'a, respectively, the following equation holds.

$$I_{i(\lambda)} = I_{o(\lambda)} \cdot T_{F(\lambda)} \cdot R_{M(\lambda)} \cdot T_{F(\lambda)}$$
$$= I_{o(\lambda)} \cdot T_{F(\lambda)}^2 \cdot R_{M(\lambda)}$$

Therefore, the transmissivity $T_{F(\lambda)}$ of the smoked plate 16'c and the reflectivity $R_{M(\lambda)}$ of the total reflecting mirror 16'a are so selected as to establish that the intensity $I_{i(\lambda)}$ of the reflected light becomes 20-60% of the intensity $I_{o(\lambda)}$ of the incident light. Thus, the reflected light from the reflecting member 16' is generally attenuated.

The total reflecting mirror 16'a and the smoked plate 16'c are fixedly connected at their outer peripheral portions by interposing these two members using a pair of frames 16'd which are connected together by screws, bonding, lock fitting, welding or molding.

In such connection, it is preferable to define a small gap between the total reflecting mirror 16'a and the smoked plate 16'c, so as to prevent the generation of interference fringes due to partial contact therebetween. In the case of using a film for the smoked member, it is unnecessary to intentionally define such a gap since the film can be easily entirely contacted with the total reflecting member 16'a.

If the smoked plate 16'c were not provided, the peripheral images would be superimposed on the projected images from the indicating surfaces 22-30, causing a reduction in visibility of the projected images. However, according to the above preferred embodiment of the present invention, since the smoked plate 16'c is provided on the front surface of the total reflecting mirror 16'a, the reflectivity of the reflecting surface 161 is reduced. As the intensity of light from the peripheral images is lower than that from the projected images from the indicating surfaces, and the light is attenuated upon incidence and reflection by the smoked plate 16'c, the peripheral images are rendered almost invisible when they reach the driver's eyes. On the other hand, although the light from the projected images is also attenuated, the visibility thereof is sufficiently ensured since the intensity of light from the projected images is sufficiently high.

Figure 15:
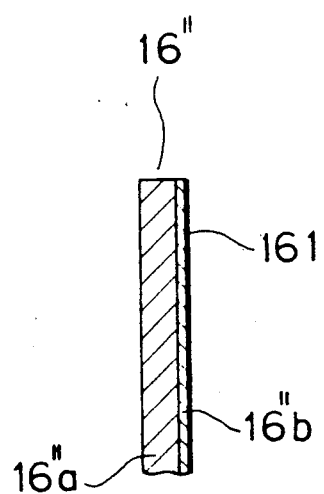
FIG. 15 is a vertical sectional view of a part of the reflecting member in a third preferred embodiment of the present invention.
Figure 12:
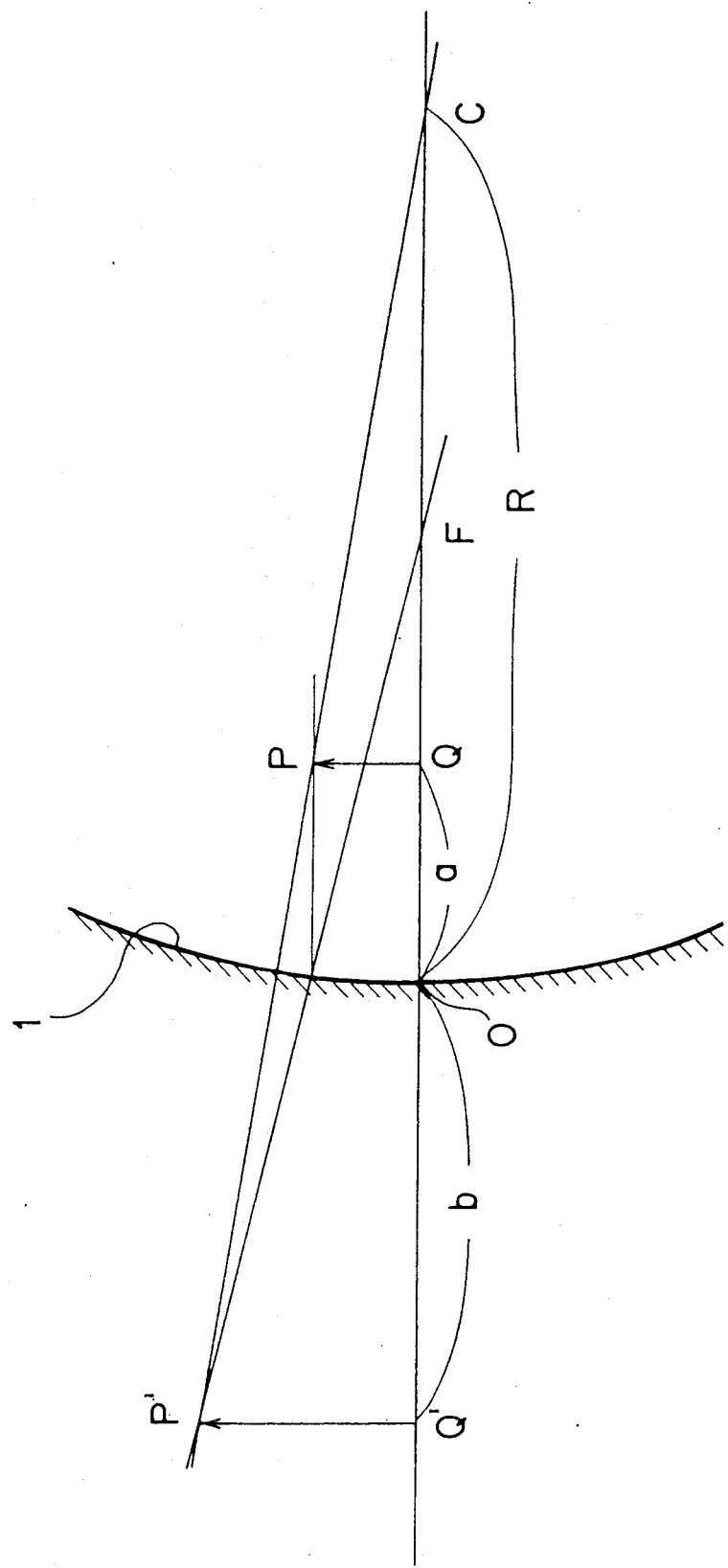
FIG. 12 is an illustration showing the principle of image magnification by a concave reflecting mirror.

Referring next to FIG. 15 which shows a third preferred embodiment of the present invention, reference numeral 16" designates a reflecting member to be mounted in the same manner as in the first preferred embodiment. The reflecting member 16" is composed of a deeply colored rigid plate 16"a such as a black acrylic resin plate having a mirror surface and a partially transmissive reflecting film 16"b such as a metal deposition film formed by depositing metal such as $TiO_2$ on the front surface of the black acrylic resin plate 16"a.

An incident light entering the reflecting surface 161 is partially reflected on the reflecting film 16"b, and is also partially transmitted therethrough to reach the black acrylic resin plate 16"a. The light having reached the black acrylic resin plate 16"a is almost absorbed, and is partially reflected. Accordingly, a reflected light from the reflecting surface 161 is widely attenuated. The color of the acrylic resin plate 16"a may be suitably selected in such a manner that the attenuation of the reflected light becomes 40-80% with respect to the incident light.

If the reflecting surface 161 were a mirror surface of a total reflecting mirror, the peripheral images would be superimposed on the projected images from the indicating surfaces 22-30, causing a reduction in visibility of the projected images. However, according to the above preferred embodiment of the present invention, since the reflecting surface 161 is formed from the deeply colored reflecting plate, the reflectivity of the reflecting surface 161 is reduced. As a peripheral portion around the indicating surfaces is deeply colored in general, the light from the peripheral images is almost absorbed and attenuated upon incidence on the reflecting surface, and the peripheral images are therefore rendered invisible when they reach the driver's eyes. In other words, a peak of spectrum of the light from the peripheral images is present at a wavelength of the deep color, and almost no other components are present in the spectrum. Therefore, the light from the peripheral images is almost absorbed upon incidence, and is hardly reflected on the reflecting surface. On the other hand, although a specific color of the light from the projected images from the indicating surfaces may be absorbed by the reflecting surface, the visibility of the projected images is sufficiently ensured since the light from the projected images has various components of spectrum.

Although the partially transmissive reflecting film 16"b is formed on the front surface of the black acrylic resin plate 16"a in the above preferred embodiment, the reflecting film 16"b may be removed according to the present invention. In this case, almost the same effect may be obtained.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An indication display unit for a vehicle, comprising:
    reflecting means provided on a dashboard at a position of an instrument panel, said reflecting means having a reflecting surface directed to a driver's seat, a backside of said reflecting means made of a non-transparent material, and said reflecting surface formed to attenuate an intensity of incident light and formed to reflect light; and
    indicating means provided at an indicator receiving portion in a steering column, said indicating means having an indicating surface directed toward said reflecting surface of said reflecting means.

2. The indication display unit as defined in claim 1, wherein said reflecting, means comprises a total reflecting mirror and a smoked member provided on a front surface of said total reflecting mirror.

3. The indication display unit as defined in claim 2, wherein said smoked member is composed of a smoked acrylic resin plate.

4. The indication display unit as defined in claim 3, wherein a small gap is defined between said smoked acrylic resin plate and said total reflecting mirror.

5. The indication display unit as defined in claim 2, wherein said smoked member is composed of a smoked polyester film.

6. The indication display unit as defined in claim 2, wherein the intensity of the reflected light is about 20-60% of the intensity of the incident light.

7. The indication display unit as defined in claim 1, wherein said reflecting means comprises a deeply colored reflecting plate having a mirror surface and a partially transmissive reflecting film provided on a front surface of said reflecting plate.

8. The indicating display unit as defined in claim 7 wherein said deeply colored reflecting plate is composed of an acrylic resin plate of a color selected such that the intensity of the reflected light is about 40-80% of the intensity of the incident light.

* * * * *